United States Patent [19]

Swanson et al.

[11] 4,343,817

[45] Aug. 10, 1982

[54] NATURAL CHEESE ANALOG

[75] Inventors: Arthur M. Swanson, 308 Kensington Dr., Madison, Wis. 53704; Robert J. Swanson, Sun Prairie, Wis.; James K. Seibel, Deerfield, Wis.; Frank L. Pavelec, Beloit, Wis.

[73] Assignees: Arthur M. Swanson, Madison; ChemVen, Inc., Sun Prairie, both of Wis.

[21] Appl. No.: 881,001

[22] Filed: Feb. 24, 1978

[51] Int. Cl.$^3$ .................... A23C 19/02; A23C 11/00
[52] U.S. Cl. ...................................... 426/36; 426/41; 426/582; 426/583
[58] Field of Search ................ 426/36, 41, 582, 583

[56] References Cited

U.S. PATENT DOCUMENTS

| 2,998,315 | 8/1961 | Peebles et al. | 426/583 |
|---|---|---|---|
| 3,397,994 | 8/1968 | Elenbogen et al. | 426/582 X |
| 3,899,605 | 8/1975 | Schaap | 426/582 |
| 3,911,143 | 10/1975 | Colmey et al. | 426/583 |
| 3,943,264 | 3/1976 | Davis | 426/583 X |
| 4,105,803 | 8/1978 | Peng | 426/582 X |
| 4,197,322 | 4/1980 | Middleton | 426/36 |

FOREIGN PATENT DOCUMENTS 37-12413 3/1962 Japan .

Primary Examiner—David M. Naff
Attorney, Agent, or Firm—Isaksen, Lathrop, Esch, Hart & Clark

[57] ABSTRACT

A natural cheese analog which closely resembles natural cheese is prepared by adding a dry casein product and calcium hydroxide to whey to form a mixture containing dissolved casein and having a pH between 6.8 and 7.3, acidifying the mixture, adding a coagulating enzyme to the acidified mixture, holding the mixture under conditions to form a continuous coagulum, cutting the continuous coagulum to form curd particles, heating the curd particles to expel whey, separating whey from the curd particles and processing the curd particles by conventional cheese making methods to obtain a natural cheese analog. Fat may be added to the mixture of casein product and whey to produce a fat-containing cheese analog.

16 Claims, No Drawings

NATURAL CHEESE ANALOG

BACKGROUND OF THE INVENTION

1. Field of the Invention

This invention relates to foodstuffs in general, and, in particular, to a natural cheese analog resembling natural cheese in body, texture and flavor and to the method of producing such a natural cheese analog.

2. Description of the Prior Art

Natural cheese is conventionally manufactured from whole milk, skim milk, nonfat dry milk, cream or combinations thereof. The initial milk product is first inoculated with a lactic acid producing bacteria culture. A coagulum is then formed in the acidified milk product by adding thereto a milk coagulating enzyme. The resultant custard-like coagulum or curd is cut into numerous particles and heated to facilitate the separation of whey from the curd. The whey is then removed from the curd, often by simple drainage, and the curd is salted and pressed into forms to produce a solid block of cheese. The cheese is kept in temperature controlled rooms to cure until the desired texture and flavor develops. The whey by-product of the cheesemaking process is often considered a waste product and is available in excess in all cheesemaking regions. Waste disposal of whey is often a pollution problem and recovery of the large amount of nutrients contained in the whey is often neglected.

The prior art contains many examples of foodstuffs utilizing therein materials derived from waste cheese whey. Some of these processes involve precipitation of the remaining solids from the whey while others use the liquid whey combined with other nutritive ingredients. Examples of such foodstuffs and the methods of manufacturing them are shown in U.S. Pat. Nos. 3,421,897; 3,466,176; 3,704,136; 3,780,182; 3,818,109; 3,922,375; 3,943,264; 3,956,520; and 4,036,999.

Another product manufactured from milk is casein. Casein is normally produced through the acidification of the fat-free portion of a milk product until a curd forms. This curd may be formed through the use of mineral, i.e., hydrochloric or sulphuric acids or through the use of lactic acid generated in a milk culture by microorganisms. The casein curd is repeatedly washed to remove remaining lactose and salts. The washed curd is passed through a press to remove some of the water, and then to hot air dryers where the water content is reduced to approximately ten percent after which the dried curd is reduced to desired size by grinding. Casein is thus commercially available as a dry powdered or granular product consisting either of dry casein alone or as casein combined with an alkaline earth, such as calcium, to produce a caseinate compound, like calcium caseinate. Inasmuch as dry casein, containing most of the protein constituents in whole milk, is normally available in this powdered or granular form, it can be easily and economically stored and shipped. In addition, dry casein is normally commercially available throughout the world at a lower price per-pound-protein than whole milk. Because of this cost advantage numerous processes have been developed to fabricate cheese-like products or cheese extenders from casein materials. However, these cheese-like products or extenders do not closely resemble natural cheese and are readily distinguishable from natural cheese. These products also do not possess the ability to coagulate to form cheese-like curd. Examples of such processes are shown in U.S. Pat. Nos. 3,397,994; 3,397,995; 3,720,520; 3,886,300; 3,917,854; 3,922,374; 3,941,891 and 4,016,298.

It has also been proposed in at least one instance to use whey as a carrier for fats with the whey then being combined with a nonfat portion of milk and the resultant combination being used as the feed substance in a cheesemaking procedure. Such a process is described in U.S. Pat. No. 3,899,605. The purpose of such a process is apparently to substitute a selected fat for the milk fat normally found in whole milk. The problem with such a process is that liquid skim milk or other liquid milk fraction must be used in the process thereby losing the cost advantage possible by using a dry powdered casein material. Other processes for substituting emulsified fats in milk solutions for use in making cheese are disclosed in U.S. Pat. Nos. 3,716,377 and 3,889,004.

SUMMARY OF THE INVENTION

The present invention is summarized in that a natural cheese analog resembling natural cheese in body, texture and flavor is produced by adding a coagulating enzyme to a media including conditioned cheese whey and a dry casein material.

It is an object of the present invention to provide a method for producing a natural cheese analog from products previously thought incapable of producing such a product.

It is another object of the present invention to provide a method for producing such a natural cheese analog in which the fat component of the produced natural cheese analog may be selected to be any desired percentage and in which the type of the fat component in the finished natural cheese analog may be selected to be any saturated and/or unsaturated fat.

It is yet another object of the present invention to provide a method for making such a natural cheese analog in which the ingredients of said method are collectively significantly cheaper in cost than the cost of whole milk.

Other objects, advantages and features of the present invention will become apparent from the following detailed description.

DETAILED DESCRIPTION

The method of producing a natural cheese analog according to the present invention begins with its initial feed material being a supply of separated liquid whey. The liquid whey for use in the present process may be sweet or acid whey or reconstituted whey solids from any conventional cheesemaking process, may be modified by demineralization and may or may not have been subjected to a lactose removal process. The preferred whey material, however, is fresh sweet cheese whey. The liquid whey feed material is normally first subjected to a heating step, preferably to approximately 165° F. for 20 seconds, though other similar temperatures and times may be utilized, to inactivate any enzymes, cultures or other undesirable clotting agents remaining in the whey from the previous cheesemaking process from which the whey is derived.

The next step in the production of the natural cheese analog of the present invention is the introduction into the liquid whey medium of a dry coagulable protein together with such fat component and emulsifying component as is desired. The coagulable protein is in the form of a dry casein material, a protein material originally derived from milk. The dry casein material for use in the present process may be dry casein produced by any of the conventionally used commercial processes for producing such material. Suitable dry casein products include lactic acid casein produced by bacterial culture acidification of skim milk, and mineral acid casein produced by direct acidification of skim milk using hydrochloric, sulphuric, or other mineral acids. Either of these acidification processes causes the casein complex proteins to separate from the milk system. The casein material produced by such a process is then dried and milled to produce a powdered or granular dry casein, this dry casin material being a conventional product of commerce in the chemical industry. The dry casein material may also be chemically combined with such alkali metal or alkaline earth metals as may be desired, as for instance with calcium hydroxide to produce calcium caseinate, with these mineral casein combinations also being useable with the present invention. The term dry casein material as used herein is meant to refer to this powdered or granular product of commerce as distinguished from the casein protein complex as found in whole milk or other milk fractions and also as distinguished from other milk solids, such as nonfat dry milk, which are produced by mere water removal or dehydration techniques, such as spray drying, and usually include other substances, such as lactose, not found in dry casein materials except at insignificant levels.

Great difficulty has heretofore existed in the production of cheese products incorporating casein in that powdered or granular casein is difficult to dissolve into aqueous solution, with casein being particularly insoluble in acidic solutions, having its point of least solubility at a pH of 4.6. The dry casein material is made more soluble in the whey medium by conditioning the whey medium with a conditioning agent including an alkali metal hydroxide or alkaline earth metal hydroxide, preferably calcium hydroxide, $Ca(OH)_2$, or a mixture of calcium hydroxide and sodium hydroxide, NaOH, to raise the pH of the medium preferably to a pH within the range of 6.8 to 7.3, preferably about 6.9. To achieve this desired neutral level, the calcium hydroxide, alone or with sodium hydroxide, is preferably added in increments to the whey medium until the desired pH level is obtained. With the pH maintained at this level and with a moderate blending temperature and medium agitation, it has been found that the dry casein material dispenses into conditioned liquid whey forming a stable suspension. The whey conditioning agent may be actually added to the whey either before, after or concurrent with the addition of the dry casein material to the whey, although the solubility of the dry casein in the whey will be negligible until the conditioning agent is added. The calcium hydroxide is particularly suited for the conditioning of the whey mixture since the dissolved calcium in the whey combines with the dissolving casein complex to form calcium caseinate in situ in the mixture.

Also at this step in the process, an emulsifier, if desired, and a selected fat may be added to the batch. Since the whey and the casein ingredients introduced into the mixture are substantially fat free, the amount and type of fats in the finished product can be accurately determined by the selected fat component introduced to the batch at this time. Preferably the fat introduced into the mixture is a vegetable oil either high in polyunsaturates such as corn oil or safflower oil or a partially hydrogenated oil such as coconut oil, soy oil, palm oil, or cottonseed oil or other such oil as may be available. By using a vegetable oil, the finished product will be substantially free of cholesterol and relatively low in saturated fats as compared to natural cheese. It is preferred that the amount of vegetable oil introduced be apportioned so that the amount of fat in the finished natural cheese analog is between about 12 and 36 percent to most closely resemble natural cheese. An emulsifier may be added to the mixture at this time, to aid in the emulsification of the fat or oil in the liquid whey-casein mixture. Most food emulsifiers such as lecithin or mono- and diglycerides can be used for this purpose. In addition, coloring, if desired, may be introduced to the mixture as well as an acqueous solution of calcium chloride, $CaCl_2$.

The mixture is next, if desired, pasteurized and homogenized. The batch is then acidified using a pH adjusting chemical such as a mineral or organic acid and/or through the natural lactic acid produced by inoculating the mixture with a cheese starter culture. Preferably such acidification is accomplished by the use of a cheese starter culture, as with natural cheese. With such a culture propagating in the medium, the pH is lowered into a range of 6.8 or less, with the preferred range being 6.3 to 6.5.

At this time a coagulating enzyme, of any of the types conventionally used in cheesemaking, is added to the medium to bring about coagulation in the liquid mixture forming a continuous coagulum. Suitable coagulating enzymes include rennet, pepsin and coagulating enzymes extracted from fungi such as *Mucor miehei* or *Mucor pusillus*, or combinations thereof. The coagulated mass is then processed in the same manner as conventional cheese curd, being cut, heated with the resultant whey being drawn off the mixture to produce a cheese-like curd, and is then salted and sometimes flavored with spices and hooped and pressed similar to natural cheese curd to produce the finished natural cheese analog.

It is this coagulating process that is at the heart of the cheesemaking process, and it is for this reason that dry casein materials have not heretofore been used in cheesemaking, since it was commonly thought that dry casein materials, even if dissolved in aqueous solution, did not possess the potential for proper coagulation to produce cheese-like curd. The fact that such a coagulated cheese-like curd was possible using dry casein material dissolved in conditioned cheese whey was a matter of some surprise to the inventors and it is believed that some characteristic or chemical constituent of the whey facilitates this coagulation process in the dissolved dry casein material.

The natural cheese analog produced from the present process is remarkably similar to natural cheese. It has a characteristic cheese-like flavor, body and texture. The lowfat versions of the natural cheese analog according to the present invention are virtually indistinguishable from conventional skim milk cheeses. The partial or full fat versions of the natural cheese analog resemble whole milk cheeses physically but will slightly differ from them in some organoleptic qualities. These differences are caused by the varying characteristics of the different fats used in the natural cheese analog as opposed to the milk fat in natural cheeses.

The advantages of the natural cheese analog of the present invention over natural cheese are many. First as explained, since the fat and/or oil in the natural cheese analog is introduced as a separate ingredient to the mixture, the nature and the amount of the fat component in the finished cheese analog can be readily manipulated. Thus, it is relatively easy to produce a low fat and low cholesterol product, or even a full-fat product that is low in cholesterol and low in saturated fats. Also, since the dry casein material is obtained in powdered or granular form, it is easy to store until ready for use and is available at a price that is significantly lower than the cost of an equivalent amount of milk protein in the form of whole or skim milk. Likewise, vegetable oils and fats are significantly cheaper than butter fat. Furthermore, since liquid whey is considered a waste product of cheese manufacture, and is over-abundant in cheese producing areas, the whey is also available at economical prices. Thus the major ingredients of the process, namely whey, casein and vegetable oil, of the present invention are available at costs collectively well below that of the fresh whole or skim milk conventionally used in cheesemaking. Furthermore, since a substantial amount of the weight of the finished natural cheese analog of the present invention is derived from liquid material and solids originating from the cheese whey, a partial recovery of what otherwise commonly becomes a waste and pollutant material is achieved.

It is also envisioned that the cheese-like curd produced in the coagulation step of the process of the present invention may also be utilized, in either a salted or unsalted form, in other food products without further processing. Such cheese-like curd can be directly utilized in processed cheese and other cheese-type products and as such may be a separate material of commerce. By the terms curd and cheese-like curd as used herein it is meant to describe the coagulum produced by the present method prior to being hooped and pressed into forms to produce solid blocks of cheese, such as, for example, long horns, daisies, blocks, midgets and barrels.

The following are examples of the performance of the method of the present invention but it is understood that our invention is not limited to the particular method and product examples and constituents described therein but embraces all variations therein as come within the scope of the claims which follow thereafter.

EXAMPLE 1

580 lbs. of liquid cheese whey was first deactivated at a temperature of 163° F. The temperature of the whey was then lowered to 150° F. and the following ingredients were added to the mixture while it was concurrently agitated:

| | |
|---|---|
| 1 lb. 10 ozs. | Ca(OH)$_2$ |
| 29 lbs. | Dry Casein |
| 10 ozs. | Lecithin |
| 19 lbs., 6 ozs. | Vegetable Oil |

The resulting blend was pasteurized for 30 minutes at 145° F. and homogenized at 750 psi. The mixture was then cooled to 92° F. and 20 lbs. of lactic cheese starter culture was added to the blend. When the pH of the mixture reached 6.4, 65 milliliters of coagulating enzyme was added to the blend while the media was held at a temperature of 92° F. A continuous coagulum was then formed in the medium. After approximately 15 minutes the coagulum was cut and the resulting cheese-like curd was heated in the whey to 103° F. to draw out additional whey from the curd, with the whey being subsequently drained. The cheese-like curd was then salted, hooped and pressed in a conventional manner subsequently resulting in approximately 90 lbs. of the natural cheese analog being produced. The natural cheese analog produced resembled natural cheese in flavor, texture and body and had a fat content slightly in excess of 20 percent.

EXAMPLE 2

15,000 lbs. of liquid whey was first heated to 168° F. for 20 seconds to inactivate any residual enzymes therein. The whey was then cooled to 145° F. and introduced into a 37,000 lb. capacity Damrow Double-O cheese vat in which 500 lbs. of partially hydrogenated vegetable oil and 16 pounds of lecithin had been heated to 150° F. Under agitation 750 lbs. of lactic casein and 33 lbs. of Ca(OH)$_2$ in acqueous solution was added thereto to bring the mixture to pH 6.85. The mixture was then pasteurized at 145° F. for 30 minutes, homogenized at 750 psi and cooled to 90° F. in preparation for the addition of the starter culture.

The starter culture had been previously prepared by mixing 100 lbs. lactic acid starter culture host medium from Galloway-West Co. into 900 lbs. of water with the host medium produced then being super-pasteurized at 200° F. for 30 minutes and cooled to 86° F. To this host medium a concentrated cheese starter culture sold under the tradename Marstar by Marschall Dairy Laboratories was added. 600 lbs. of the resultant cheese starter culture was added to the whey, casein, vegetable oil and lecithin mixture.

Following the addition of the starter culture the acidity of the mixture was lowered until the pH 6.38 was reached after which 65 fl. oz. cheese coloring and 60 fl. oz. of a coagulating enzyme extrated from *Mucor miehei*, Marzyme, was added. The mixture was then held at 88° F. until a firm coagulum was formed. When the coagulum was judged properly set, this cheese-like curd was cut using the curd knives in the vat and the curd was heated slowly over a period of 30 minutes to 103° F. while it was concurrently agitated for 30 minutes. The batch was then transferred to a curd table so that the curd would settle while the whey was drawn off. The curd was continually stirred to keep the curd particles loose while the whey was drained. When sufficient whey was drained, the curd was salted using approximately 4 lbs. of salt per 100 lbs. of curd, and the curd was packed in 40 lb. square Wilson-style cheese hoops lined with cheese bandages and placed in a cheese press overnight. The following day the pressed cheese analog was removed from the hoops, wrapped in laminated cellophane film coated with parafin and latex, heat sealed and placed in cardboard boxes and stored at 40° F. until ready for use. This batch produced approximately 2,500 lbs. of natural cheese analog closely resembling natural American-style Cheese.

EXAMPLE 3

20,000 lbs. of liquid cheese whey was first heated to 165° F. for 20 seconds to inactivate any residual enzyme. The whey was then cooled to 80° to 90° F. and introduced into a 37,000 lb. Damrow Double-O cheese vat and held under agitation as 1,320 lbs. of New Zealand lactic acid dry casein was added thereto. 5 lbs. of 40 percent NaOH aqueous solution was added to the mixture together with approximately 45 lbs. of powdered Ca(OH)$_2$ in acqueous solution to bring the mixture pH to 6.9 to solubalize the casein material. The mixture was then heated to 120° F. and cooled to 90° F. in preparation for the addition of the starter culture.

The starter culture had been previously prepared by mixing 100 lbs. lactic acid starter culture host medium from Dederick Co. into 900 lbs. of water with the liquid host medium produced then being super-pasteurized at 200° F. for 30 minutes and then cooled to 86° F. To this host medium a concentrated cheese starter culture sold under the tradename Marstar by Marschall Dairy Laboratories was added. 800 lbs. of the resultant cheese starter culture was added to the whey and casein mixture.

Following the addition of the starter culture the acidity of the mixture was lowered until the pH 6.4 was reached after which 160 fl. oz. of aqueous calcium chloride ($CaCL_2$) and 80 fl. oz. of a coagulating enzyme extracted from *Mucor pussillus*, Emperase were added. The mixture was then held at 88° to 90° F. until a firm coagulum was formed. When the coagulum was judged properly set, it was cut using the curd knives in the vat and the resulting curd particles were heated slowly over a period of 20 minutes to 103° F. while concurrently agitated. The batch was then transferred to a curd table so that the curd would settle while the whey was drawn off. The curd was continually stirred to keep the curd particles loose while the whey was drained. When sufficient whey was drained, the curd was salted using 2¾ lbs. of salt per 100 lbs. of curd, and the curd was packed in polyethylene lined 500 lb. capacity steel barrels and allowed to drain overnight. The following day the barrels were uprighted and were stored at 40° F. until ready for use. This batch produced approximately 3,100 lbs. of natural cheese analog very closely resembling natural skim milk cheese.

EXAMPLE 4

370 lbs. of liquid whey was heated to 168° F. for 30 seconds to deactivate any residual enzymes. The whey was cooled to 140° F. and the following ingredients were added under agitation: 13 lbs. partially hydrogenated vegetable oil and 6½ ozs. of lecithin which had been preheated together to 140° F., 16½ lbs. lactic casein, and 11 ozs. calcium hydroxide in aqueous solution. The mixture was pasteurized at 150° F. for 15 minutes, homogenized at 300 psi and cooled to 90° F. A 10 percent solution of hydrochloric acid was added to the mixture until the pH was adjusted to 5.6. The acidified mixture was then heated to 110° F. at which time 72½ milliliters of coagulating enzyme and 35 grams of calcium chloride in aqueous solution were added. A continuous coagulum was then formed in the product. After approximately 15 minutes the coagulum was cut and the cheese-like curd was heated to 120° F. over 35 minutes under continuous agitation. The whey was drained from the curd and sufficient 170° F. water was added to cover the curd, converting it into a taffy-like mass. This mass was repeatedly stretched until the desired elastic texture was obtained. The product was then placed in 5 lb. cheese molds, cooled in water and held overnight in a saturated salt brine. The following day the 5 lb. loaves were sealed in heat-shrinkable plastic type film. This batch produced approximately 40 lbs. of natural cheese analog closely resembling natural mozzarella cheese.

We claim:

1. A method for producing a natural cheese analog comprising the steps of:
   (a) adding a quantity of dry material consisting essentially of casein into a quantity of liquid cheese whey, and adding during or after the addition of said material calcium hydroxide in an amount sufficient to raise and maintain the pH of the resultant casein and whey mixture to between 6.8 and 7.3 whereby the casein is dissolved in the whey;
   (b) acidifying the whey and casein mixture;
   (c) adding a coagulating enzyme to the mixture and holding the mixture under conditions so that a continuous coagulum is formed; and
   (d) processing the coagulum by (i) cutting the continuous coagulum to form small curd particles, (ii) heating the curds to draw out whey from the curds, (iii) drawing off the whey to separate the curds and whey, (iv) adding salt to the curds and hooping and pressing the curds to produce the natural cheese analog.

2. A method for producing a natural cheese analog as claimed in claim 1 further including before the addition of casein the step of heating the whey to inactivate any residual enzymes therein.

3. A method for producing a natural cheese analog as claimed in claim 1 further including before acidifying pasteurizing and homogenizing the casein and whey mixture.

4. A method for producing a natural cheese analog as claimed in claim 1 wherein acidifying the mixture includes the steps of introducing a cheese starter culture into the mixture, and maintaining the mixture in a condition favoring the growth of the culture to acidify the mixture.

5. A method for producing a natural cheese analog as claimed in claim 1 wherein the coagulating enzyme is selected from the group consisting of rennet, pepsin, enzyme extracted from *Mucor miehei*, enzyme extracted from *Mucor pussillus* and combinations thereof.

6. A method for producing a natural cheese analog as claimed in claim 1 wherein a quantity of a selected fat is introduced into the mixture prior to the acidification step.

7. A method for producing a natural cheese analog as claimed in claim 6 wherein the selected fat is a vegetable oil.

8. A method for producing a natural cheese analog as claimed in claim 1 wherein the dry casein is selected from the group consisting of casein precipitated by lactic acid produced by lactic acid bacteria and casein precipitated by mineral acid.

9. A method for producing a natural cheese analog as claimed in claim 1 wherein the liquid cheese whey is sweet cheese whey.

10. A method of producing a coagulated curd comprising the steps of:
   (a) introducing a quantity of dry material consisting essentially of casein into a quantity of liquid cheese whey, and adding during or after the addition of said material calcium hydroxide in an amount sufficient to raise and maintain the pH of the resultant casein and whey mixture to between 6.8 and 7.3 whereby the casein is dissolved in the whey;
   (b) acidifying the casein and whey mixture;
   (c) adding a coagulating enzyme to the mixture and holding the mixture under conditions to produce a continuous coagulum; and
   (d) processing the coagulum by (i) cutting the continuous coagulum to form small curd particles, (ii) heating the curds to draw out whey from the curds, and (iii) drawing off the whey to separate the curds and whey.

11. A method of producing a coagulated curd as claimed in claim 10 wherein a quantity of selected fat is introduced into the mixture prior to the acidification step.

12. A method of producing a coagulated curd as claimed in claim 11 wherein the selected fat is a vegetable oil.

13. A method of producing a coagulated curd as claimed in claim 10 further including before the addition of casein material the step of heating the whey to inactivate any enzymes or cultures therein.

14. A method of producing a coagulated curd as claimed in claim 10 wherein the acidifying step includes the steps of adding a cheese starter culture to the mixture, and maintaining the mixture under conditions favorable to the growth of the culture to produce lactic acid.

15. A method of producing a coagulated curd as claimed in claim 10 wherein the coagulating enzyme is selected from the group consisting of rennet, pepsin, enzyme extracted from Mucor miehei, enzyme extracted from Mucor pussillus and combinations thereof.

16. A method of producing a coagulated curd as claimed in claim 10 wherein the liquid cheese whey is sweet cheese whey.

* * * * *